United States Patent [19]

Conlon

[11] Patent Number: 5,438,843
[45] Date of Patent: Aug. 8, 1995

[54] MEANS FOR LIQUID PURIFICATION BY BATCH CRYSTALLIZATION

[76] Inventor: William M. Conlon, 2330 Bryant St., Palo Alto, Calif. 94301

[21] Appl. No.: 181,816

[22] Filed: Jan. 18, 1994

[51] Int. Cl.$^6$ .............................................. B01D 9/04
[52] U.S. Cl. ........................................ 62/124; 62/532; 62/324.1
[58] Field of Search .................. 62/123, 124, 324, 532

[56] References Cited

U.S. PATENT DOCUMENTS

| | | | |
|---|---|---|---|
| 3,404,536 | 10/1968 | Aronson | 62/58 |
| 3,667,243 | 6/1972 | Cheng | 62/58 |
| 4,003,213 | 1/1977 | Cox | 62/124 |
| 4,799,945 | 1/1989 | Chang | 62/532 |
| 4,954,151 | 9/1990 | Chang et al. | 62/532 |
| 5,113,664 | 5/1992 | Conlon | 62/124 |

Primary Examiner—Ronald C. Capossela

[57] ABSTRACT

A batch crystallization system uses two stages of heat pumping. The first stage heat pump transfers latent heat of fusion from a freezing liquid to purified liquid. Sensible heat and compression work are transferred to the second stage heat pump for rejection to the environment. Ice formed in another chamber of the batch crystallization system is melted by direct contact with heated purified liquid.

1 Claim, 2 Drawing Sheets

MEANS FOR LIQUID PURIFICATION BY BATCH CRYSTALLIZATION

BACKGROUND

1. Field of the Invention

This invention relates to liquid purification methods and means employing freeze crystallization using multiple batch crystallization chambers wherein a liquid is partially frozen, the unfrozen liquid fraction is extracted, and the remaining crystalline phase is melted. Generally, the invention relates to systems using indirect cooling, that is, the coolant is separated from the liquid to be purified by the walls of the crystallization chamber, and direct heating, that is the frozen fraction is melted by circulation of warm previously purified liquid through the chamber containing the frozen fraction. More particularly, the invention relates to those systems where the purified liquid is warmed by the heat rejected from a heat pump which is extracted thermal energy from an alternate crystallization chamber, and to the use of multiple stages of heat pumping to reduce energy consumption.

2. Description of the Prior Art

A batch crystallization apparatus for liquid purification operates in a cycle consisting of the following steps repeated in sequence:
 (a) fill a chamber with the liquid to be purified;
 (b) remove heat from the chamber to form frozen liquid of the desired thickness;
 (c) drain the unfrozen liquid containing the concentrated impurities from the chamber;
 (d) melt the purified frozen liquid and drain it into a storage tank or vessel for use.

Because the solubility of impurities is much higher in the liquid phase than in the solid phase, the impurities become relatively concentrated in the unfrozen liquid and the crystalline solid (for example, ice) is relatively purified. The frozen liquid can be melted using electric heating, storage of the heat removed during the freezing step, or using the heat removed from a second chamber whose freezing step coincides with the melting step of tile first chamber.

For example, U.S. Pat. No. 4,799,945, issued Jan. 24, 1989 to Chang suggests using a vapor compression system whereby refrigerant evaporates in one chamber to form ice, is compressed and then condensed in a second chamber to effect the melting of ice previously formed. Dual crystallization chambers are operated alternately in freezing and melting fashions, with the refrigerant or a heat transfer fluid circulated on the outside of the chambers.

In the Chang system, the direction of heat addition and heat removal are coincident, which leads to certain practical difficulties. First, the ice melts away from the heat transfer surface, resulting in poor utilization of the available heat transfer area since only the lower portion of the chamber, where the melted liquid collects, has intimate contact between the ice and the surfaces being heated by condensing refrigerant. Second, the Chang method requires that the walls of the freezing chamber be alternately cooled and then heated to effect the melting, resulting in reduced production capacity and reduced efficiency.

Chang et al., U.S. Pat. No. 4,954,151, issued Sept. 4, 1990, describe a means of maintaining ice in contact with the walls of the chamber during the melting phase. In one embodiment of a batch purification chamber, ice is foraged on a horizontal cold plate which is in contact with the upper surface of the water to be purified. In this embodiment, after the unfrozen liquid fraction is withdrawn from the chamber, the purified ice sheet is held against the cold plate by springs, and then heat is applied through the cold plate.

Conlon et al., U.S. Pat. No. 5,113,664, issued May 19, 1992, describe a simplified system that eliminates the need for springs to hold the ice against the cold plate. In this system, the ice is allowed to fall from the cold plate onto a heated melter bar, where it splits into two pieces which are then directed by gravity against the heated bare by means of inclined mils against. However, either this system nor that of Chang et al. address vertically oriented freezing chambers.

Chang has also described means for alternating the flow of hot and cold refrigerant or hot and cold heat transfer fluid from one chamber to another to effect the melting. In one of Chang's embodiments, two vapor compressors, a heat pump, and a complex arrangement of refrigerant valves was used to transfer heat from one chamber to another and to reject heat to the environment. In another embodiment, Chang proposed a single vapor compressor with heat rejected first to the melting chamber and then to via a secondary heat exchanger to the environment, requiring that all of the heat removed from the freezing chamber is pumped to a high temperature sufficient for rejection to the environment. In a third embodiment, Chang proposed a single heat pump and intermediate heat transfer fluids for heating and cooling. In each of the embodiments, the same coil was used for both heating and cooling, resulting in inefficiency due to the need to add and remove heat from the coils themselves.

SUMMARY OF THE INVENTION

Accordingly, the present invention provides a means of rapidly and efficiently melting purified frozen liquid within a vertical batch crystallization chamber by circulating heated purified liquid along the surface of the crystallized fraction.

Another object of the invention is increase the efficiency of a batch crystallization system by minimizing the alternating heating and cooling of the refrigerant side side of the crystallization chamber.

Still another object of the invention is to reduce the cost and complexity of batch crystallization systems by reducing the number of valves required to control the flow of refrigerant to the batch crystallization chambers.

Still another object of the invention is to reduce the size and number of heat pumps required to operate the batch crystallization system.

Still another object of the invention is to reduce the amount of heat that must be pumped to a high temperature sufficient for rejection to the environment by providing two stages of compression.

Drawing Reference Numerals

11 First crystallization chamber
12 Second crystallization chamber

17 Tube Side
18 Shell Side
20 Holding Tank
21 Pump
22 First Melt Water Inlet Block Valve
23 Second Melt Water Inlet Block Valve
24 First Melt Water Outlet Block Valve
25 Second Melt Water Outlet Block Valve
26 Purified Liquid Heat Exchanger
27 Level Control Valve
30 Purified Liquid Heat Exchanger
31 Concentrated Liquid Heat Exchanger
32 First Feed Block Valve
33 Second Feed Block Valve
34 First Waste Block Valve
35 Second Waste Block Valve
50 Suction Manifold
51 Primary Vapor Compressor
52 Secondary Heat Exchanger
53 Primary Heat Exchanger
54 Primary Expansion Valve
55 First Refrigerant Inlet Valve
56 Second Refrigerant Inlet Valve
57 Secondary Vapor Compressor
58 Tertiary Heat Exchanger
59 Secondary Expansion Valve

DESCRIPTION OF THE PREFERRED EMBODIMENT

The preferred embodiment of the inventive system is described with reference to FIG. 1, a schematic flow diagram showing a First Crystallization Chamber 11 and a Second Crystallization Chamber 12. Both crystallization chambers are identical heat exchangers, preferably of shell and tube type although plate type heat exchangers can also be used, with a single tube pass, and with the tubes oriented vertically. Refrigerant flows on the Shell Side 18 of the heat exchangers, that is on the outside of the tubes, and the liquid to be crystallized flows on the Tube Side 17.

Figure 1:
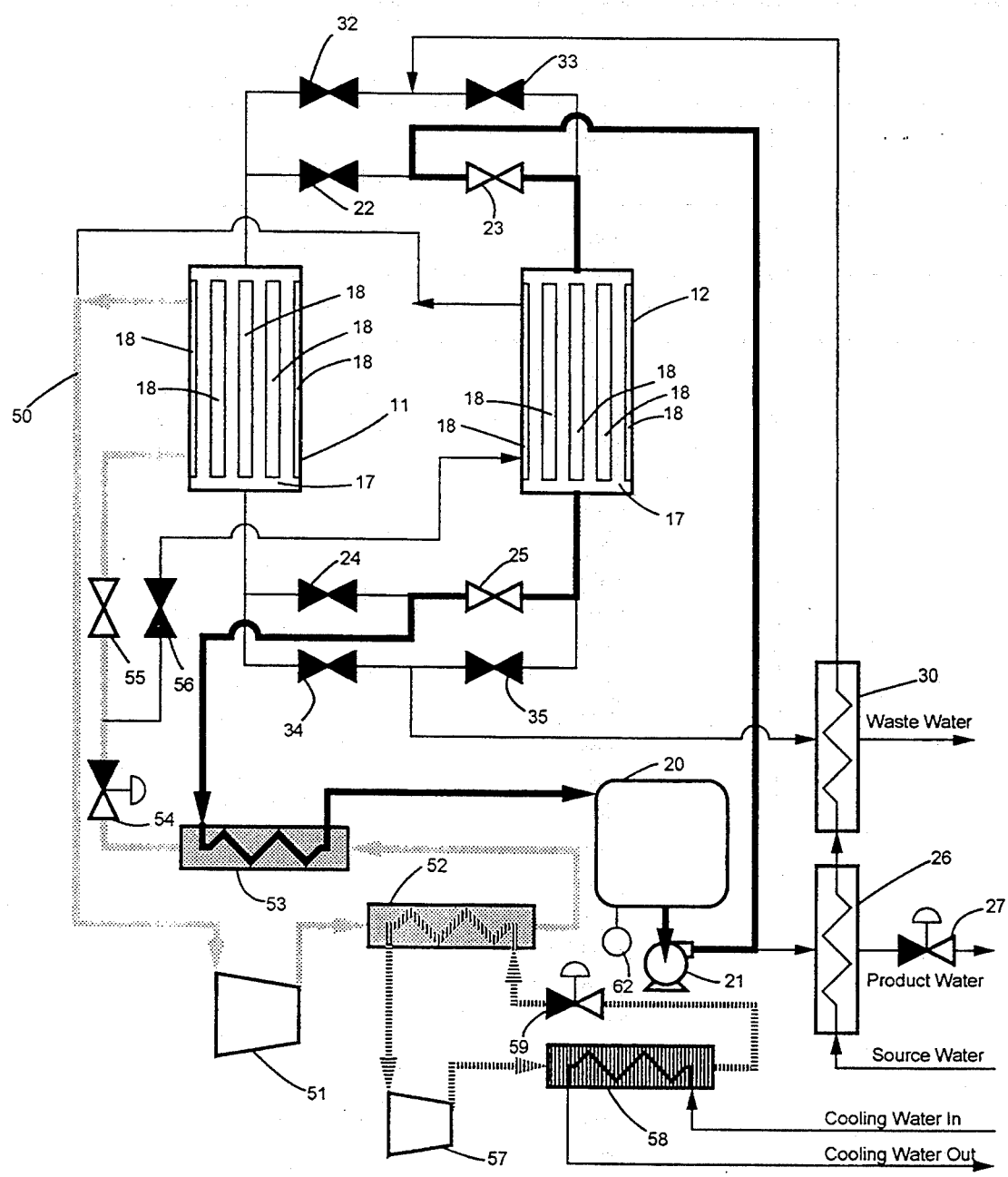
FIG. 1 shows a schematic diagram of the inventive system.

To facilitate understanding of the invention, FIG. 1 depicts the First Crystallization Chamber 11 operating in the freezing step and the Second Crystallization Chamber 12 operating in the melting step of the batch crystallization process. It is understood that the description of freezing and melting apply equally to both chambers, or to a multiplicity of chambers.

Still referring to FIG. 1, the primary cooling cycle will next be described. The primary cooling cycle is a vapor compression refrigeration cycle which operates between a temperature slightly below the freezing point and a temperature slightly above the melting point of the liquid to be purified. Low pressure primary refrigerant liquid evaporates on the Shell Side 18 of the First Crystallization Chamber 11, absorbing sensible and latent heat from the liquid on the Tube Side 17 of the First Crystallization Chamber. The evaporated low pressure primary refrigerant vapor flows to Suction Manifold 50 and then to Primary Vapor Compressor 51. Hot compressed primary refrigerant vapor emerging from the Primary Vapor Compressor 51 enters Secondary Heat Exchanger 52 and is cooled and partially condensed, and then flows to Primary Heat Exchanger 54 where the balance of the primary refrigerant vapor is condensed. The condensed, high pressure primary refrigerant liquid flows across Primary Expansion Valve 54 producing low pressure and temperature primary refrigerant liquid and vapor. The two-phase mixture of low pressure refrigerant then flows through the open First Refrigerant Inlet Valve 55 and enters the Shell Side 18 of the First Crystallization Chamber 11. The Second Refrigerant Inlet Valve 56 is closed to prevent cold refrigerant from entering the Shell Side 18 of the Second Crystallization Chamber 12.

Still referring to FIG. 1, the melting cycle will next be described. To melt the crystals within the Tube Side 17 of the Second Crystallization Chamber 12, purified liquid is drawn from the Holding Tank 20 by the Pump 2 1 and flows through the open Second Melt Water Inlet Block Valve 23 into the Tube Side 17 of the Second Crystallization Chamber 12. The purified liquid flowing within the Tube Side 17 of the Second Crystallization Chamber 12 is cooled by the melting of crystals and as the purified liquid exits the Second Crystallization Chamber, the mass flow rate of flowing purified liquid has been increased by the amount of melting and the flowing purified liquid has been cooled to approximately the melting temperature of the crystals. The cooled purified liquid then flows through the Second Melt Water Outlet Block Valve 25 and enters the Primary Heat Exchanger 55 where the purified liquid is warmed by the condensation of primary Refrigerant and then returns to the Holding Tank 20. The mass of purified liquid obtained by melting the crystals increases the liquid level of the Holding Tank 20. Purified liquid that is not required for melting is transferred from the Holding Tank 20 by opening Level Control Valve 27. It may be economical to pass purified liquid through a Purified Liquid Heat Exchanger 26 to cool source water to be treated in the crystallization chambers.

Still referring to FIG. 1, the secondary refrigerant cycle will next be described. The secondary refrigerant cycle is a vapor compression cycle operating between a temperature slightly above the melting temperature of the liquid to be purified (but below the primary refrigerant condensing temperature) and a temperature slightly above the environment. Secondary refrigerant is evaporated in Secondary Heat Exchanger 52 to absorb the excess heat from the primary refrigerant cycle, which is comprised of compression work imparted by the Primary Vapor Compressor 51, sensible heat absorbed from the liquid to be crystallized and heat gained from the environment. The low pressure secondary refrigerant vapor is compressed by Secondary Vapor Compressor 57 and is condensed in the Tertiary Heat Exchanger 58 to reject heat to the environment, for example, cooling water. The condensed high pressure secondary refrigerant is throttled to low pressure by the Secondary Expansion Valve 59 to create low temperature two-phase liquid refrigerant which then flows to the Secondary Heat Exchanger 52.

Still referring to FIG. 1, the flow of raw liquid during the filling step will next be described. Raw liquid to be purified is pre-cooled by flowing first through Purified Liquid Heat Exchanger 26 and then through Concentrated Liquid Heat Exchanger 30. The pre-cooled raw liquid then may enter the Tube Side 17 of either the First Crystallization Chamber 11 or the Second Crystallization Chamber 12, depending on whether the First Raw Liquid Block Valve 32 or the Second Raw Liquid Block Valve 33 is open.

DESCRIPTION OF ALTERNATIVE EMBODIMENTS

Figure 2:
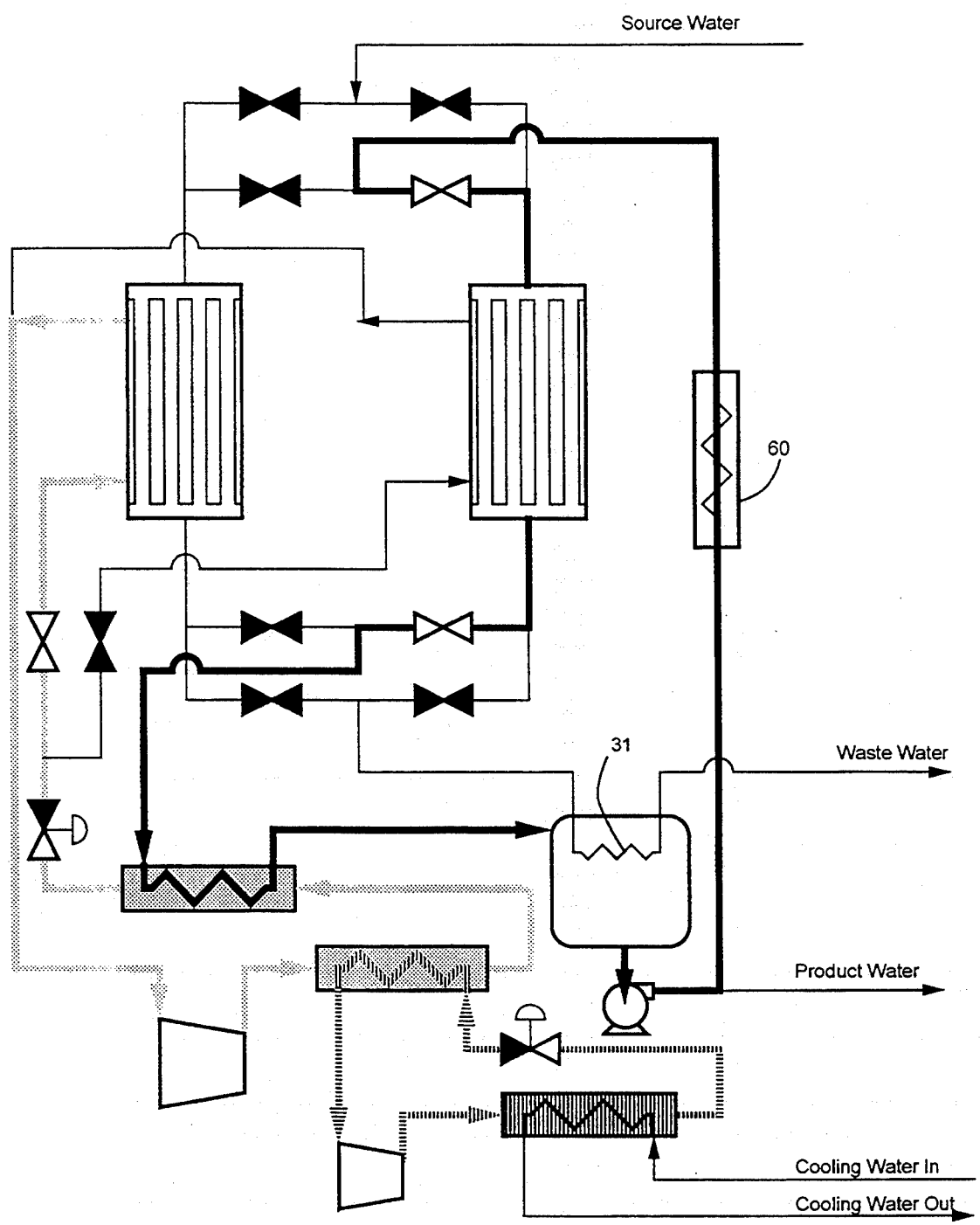
FIG. 2 shows an alternative embodiment of the present invention.

Because of the intermittent nature of the flow of raw liquid and waste liquid, it may be desirable to use the cold concentrated liquid to cool the water in the Holding Tank 20 instead of cooling the raw liquid. FIG. 2 shows an alternate embodiment of the present invention with a Concentrated Liquid Cooling Coil 31 in the Holding Tank 20.

OPERATION OF THE INVENTION

The inventive system can be controlled by conventional relay control systems to start and stop the compressors and pump and sequence the valves to direct the raw liquid, purified liquid, concentrated liquid and refrigerant as previously described.

When the inventive system is started, there is no ice in the Second Crystallization Chamber 12, so it may be desirable to provide auxiliary cooling of the purified liquid so the first batch of ice can be produced in the normal amount of time. The purified liquid can be cooled by an Auxiliary Heat Pump 60, shown in FIG. 2.

Upon initial start up of the inventive system, the Holding Tank 20 must be charged with a sufficient amount of liquid to provide for the melting of ice and the cooling of the primary refrigerant. This can be done by filling the Holding Tank 20 with liquid that has already been purified, or the inventive system can bootstrap itself as described next. First, the Holding Tank 20 is filled with raw liquid. As the inventive system is operated as previously described, the concentration of impurities will be successively diluted by each batch of crystallization. After a sufficient number of batches, the concentration of impurities will have been reduced to an acceptable level. A level sensor 62 may be provided on to interlock the Level Control Valve 27 and prevent excessive transfer of purified liquid out of the Holding Tank 20. Therefore the present invention provides a means and method of efficiently melting the ice produced in a batch crystallization apparatus. By staging the heat pumping, the majority of heat, the latent heat of fusion, is transferred across a smaller temperature rise than in previous batch crystallization systems, thereby improving energy efficiency. The present invention reduces sensible heat addition to the crystallization chambers during the melting step, thereby improving energy efficiency, by melting ice from the inside of the chamber, rather than through the chamber walls. Moreover, the present invention provides means for starting up the batch crystallization system.

I claim:
1. A batch crystallization system comprising:
   (a) a plurality of crystallizer means, consisting of at least a first indirect contact heat exchanger and a second indirect contact heat exchanger, said indirect contact heat exchangers having a coolant side and a cooled side,
   (b) means for selectively conveying a liquid to be purified to the cooled side of the first heat exchanger,
   (c) means for selectively conveying a primary refrigerant to the coolant side of said first heat exchanger to extract sensible heat and latent heat from said liquid to be purified,
   (d) primary heat pump means for converting work into increased thermodynamic potential of the primary refrigerant,
   (f) means for transferring the sensible heat and the work from said primary refrigerant to a secondary refrigerant,
   (g) heating means for transferring the latent heat from said primary refrigerant to a purified liquid,
   (h) means for selectively draining an uncrystallized fraction of said liquid to be purified from the crystallizer means,
   (i) means for conveying a purified liquid through the heating means,
   (j) means for selectively conveying the purified liquid from the heating means to the cooled side of the second heat exchanger,
   (k) secondary heat pump means for transferring heat absorbed from the primary refrigerant to an ambient coolant, and
   (l) means for alternating the conveyance of the primary refrigerant and the purified liquid between the first heat exchanger and the second heat exchanger.

* * * * *